United States Patent [19]

Barry et al.

[11] Patent Number: 5,589,561
[45] Date of Patent: *Dec. 31, 1996

[54] BIORIENTED BLOWN FILM

[75] Inventors: Russell P. Barry; Bernard Pellereau, both of Richterswil, Switzerland

[73] Assignee: The Dow Chemical Company, Midland, Mich.

[*] Notice: The portion of the term of this patent subsequent to Aug. 31, 2010, has been disclaimed.

[21] Appl. No.: 560,599

[22] Filed: Nov. 20, 1995

Related U.S. Application Data

[60] Continuation of Ser. No. 108,875, Aug. 18, 1993, abandoned, which is a division of Ser. No. 535,097, Jun. 8, 1990, Pat. No. 5,241,030.

[30] Foreign Application Priority Data

Jun. 27, 1989 [GB] United Kingdom ................ 8914703

[51] Int. Cl.$^6$ .......................... B32B 27/10; C08L 23/20
[52] U.S. Cl. .................... 526/348.1; 526/348.3; 526/348.4; 526/348.5; 526/348.6; 525/240; 428/332; 428/339; 428/500; 428/516; 428/910
[58] Field of Search ................ 526/348.1, 348.3, 526/348.4, 348.5, 348.6; 525/240; 428/332, 339, 500, 516, 910

[56] References Cited

U.S. PATENT DOCUMENTS

| | | |
|---|---|---|
| 3,371,464 | 3/1968 | Swick . |
| 3,456,044 | 7/1969 | Pahlke . |
| 3,555,604 | 1/1971 | Pahlke . |
| 3,645,992 | 2/1972 | Elston . |
| 3,914,342 | 10/1975 | Mitchell . |
| 4,076,698 | 2/1978 | Anderson et al. . |
| 4,243,619 | 1/1981 | Fraser et al. . |
| 4,352,849 | 10/1982 | Mueller . |
| 4,405,774 | 9/1983 | Miwa et al. ................ 526/348.2 |
| 4,429,079 | 1/1984 | Shibata et al. . |
| 4,486,552 | 12/1984 | Niemann . |
| 4,544,762 | 10/1985 | Kaminsky et al. . |
| 4,597,920 | 7/1986 | Golike . |
| 4,640,856 | 2/1987 | Ferguson . |
| 4,668,752 | 5/1987 | Tominari et al. . |
| 4,680,207 | 7/1987 | Murray ................ 428/35 |
| 4,724,185 | 2/1988 | Shah . |
| 4,737,391 | 4/1988 | Lustig et al. . |
| 4,755,403 | 7/1988 | Ferguson . |
| 4,755,419 | 7/1988 | Shah . |
| 4,798,081 | 1/1989 | Hazlitt et al. . |
| 4,801,486 | 1/1989 | Quacquarella et al. . |
| 4,820,557 | 4/1989 | Warren . |
| 4,863,769 | 9/1989 | Lustig et al. . |
| 4,863,784 | 9/1989 | Lustig et al. . |
| 4,865,902 | 9/1989 | Golike et al. . |
| 4,886,690 | 12/1989 | Davis et al. . |
| 4,927,708 | 5/1990 | Herran et al. . |
| 4,952,451 | 8/1990 | Mueller . |
| 4,957,790 | 9/1990 | Warren . |
| 4,963,419 | 10/1990 | Lustig et al. . |
| 4,963,427 | 10/1990 | Botto et al. . |
| 4,976,898 | 12/1990 | Lustig et al. . |
| 4,977,022 | 12/1990 | Mueller . |
| 4,981,760 | 1/1991 | Naito et al. . |
| 4,988,465 | 1/1991 | Lustig et al. . |
| 5,006,398 | 4/1991 | Banerji . |
| 5,015,749 | 5/1991 | Schmidt et al. . |
| 5,026,798 | 6/1991 | Canich . |
| 5,032,463 | 7/1991 | Smith . |
| 5,041,316 | 8/1991 | Parnell et al. . |
| 5,041,584 | 8/1991 | Crapo et al. . |
| 5,041,585 | 8/1991 | Deavenport et al. . |
| 5,055,328 | 10/1991 | Evert et al. . |

(List continued on next page.)

FOREIGN PATENT DOCUMENTS

| | | |
|---|---|---|
| 141597A1 | 5/1985 | European Pat. Off. . |
| 243965A2 | 4/1987 | European Pat. Off. . |
| 333508A2 | 9/1989 | European Pat. Off. . |
| 404368A2 | 12/1990 | European Pat. Off. . |
| 404969A1 | 1/1991 | European Pat. Off. . |
| 416815A2 | 3/1991 | European Pat. Off. . |
| 452920A2 | 10/1991 | European Pat. Off. . |
| 217252B1 | 11/1991 | European Pat. Off. . |
| 495099A1 | 7/1992 | European Pat. Off. . |
| 597502A2 | 5/1994 | European Pat. Off. . |
| 600425A1 | 8/1994 | European Pat. Off. . |
| 2123747 | 2/1984 | United Kingdom . |
| 2206890 | 1/1989 | United Kingdom . |
| 9106426 | 5/1991 | WIPO . |
| 9214784 | 9/1992 | WIPO . |
| 9307210 | 4/1993 | WIPO . |
| 9308221 | 4/1993 | WIPO . |
| 94/07930 | 4/1994 | WIPO . |
| 94/07954 | 4/1994 | WIPO . |
| 94/18263 | 8/1994 | WIPO . |
| 94/28064 | 8/1994 | WIPO . |

OTHER PUBLICATIONS

Modern Plastics International, vol. 23, No. 8, Aug. 1993, pp. 40–41, Don Schwank "Single–site metallocene catalysts yield tailor–made polyolefin resins".

(List continued on next page.)

Primary Examiner—Fred Teskin

[57] ABSTRACT

At least one layer of a mono- or multilayered, bioriented film contains as film-forming polymers (A) from 75 to 100 percent of a linear ethylene/alpha-olefin copolymer having a density of from 0.890 g/cm$^3$ to 0.930 g/cm$^3$ and (B) from 25 to 0 percent of a high density linear polyethylene having a density of from 0.935 g/cm$^3$ to 0.960 g/cm$^3$. All percentages are based on the total weight of (A) and (B).

The total of the film-forming polymers (A) and (B) has a single melting point as determined by differential scanning calorimetry.

The bioriented film is produced by biorienting a flat film in at least two steps first in one direction and then in the other direction. The bioriented film is useful in a process for packaging an article wherein the film is wrapped around the article, heat-shrunk and sealed.

6 Claims, 6 Drawing Sheets

U.S. PATENT DOCUMENTS

| | | |
|---|---|---|
| 5,055,438 | 10/1991 | Canich . |
| 5,059,481 | 10/1991 | Lustig et al. . |
| 5,064,802 | 11/1991 | Stevens et al. . |
| 5,075,143 | 12/1991 | Bekele . |
| 5,089,321 | 2/1992 | Chum et al. . |
| 5,091,228 | 2/1992 | Fujii et al. .......................... 428/34.3 |
| 5,106,545 | 4/1992 | Warren . |
| 5,106,688 | 4/1992 | Bradfute et al. . |
| 5,112,674 | 5/1992 | German et al. . |
| 5,132,074 | 7/1992 | Isozaki et al. . |
| 5,206,075 | 4/1993 | Hodgson, Jr. . |
| 5,241,030 | 8/1993 | Barry et al. . |

OTHER PUBLICATIONS

ANTEC '92 Proceedings, pp. 154–158 ("Exact™Linear Ethylene Polymers for Enhanced Sealing Performance" by D. Van der Sanden and R. W. Halle).

Society of Plastics Engineers, Polyolefins VII International Conference, Feb. 24–27, 1991, "Structure/Property Relationships in Exxpol™Polymers", pp. 45–66, Speed et al.

ACS Symposium Series No. 142, "Polymer Characterization by ESR and NMR", by J. C. Randall, pp. 93–118, (1980).

Polymer Engineering and Science, vol. 17, No. 11, 1977, "Correlation of Low Density Polyethylene Rheological Measurements with Optical and Processing Properties", pp. 769–774 (1977).

Rheometers for Molten Plastics, John Dealy, Van Nostrand Reinhold Co (1982), pp. 97–99.

The Encyclopedia of chemical Technology, Kirtk–Othmer, Third Edition, John Wiley & Sons, New York, 1981, vol. 16, p. 415–417.

Then Encyclopedia of Chemical Technology, Kirk–Othmer, Third Edition, John Wiley & Sons New York, 1981, vol. 18, pp. 191–192.

Journal of Polymer Science, Poly. Phys. Ed., "Determination of Branching Distributions in Polyethylene and Ethylene Copolymers", vol. 20, pp. 441–455 (1982) Wild et al.

Journal of Rhelogy, "Wall Slip in Viscous Fluids and Influence of Materials of Construction", 30(2), pp. 337–357 (1986), by Ramamurthy.

Proceedings of the 1991 IEEE Power Engineering Sciety, pp. 184–190, Sep. 2–27, 1991, "New Speciality Linear Polymers (SLP) for Power Cables", by hendewerk et al.

1991 Polymers, Laminations & Coatings Conference, pp. 103–111, "A new Family of Linear Ethylene Polymers with Enhanced Sealing Performance designed for Multilayers Barrer Food paackaging Films" by D. Van der Sanden and R. W. Halle.

1991 Polymers, Laminations & Coatings Conference, pp. 289–296, "A New Family of Linear Ethylene Polymers Provides Enhanced Sealing Performance" by Van der Sanden et al.

Feb. 1992 Tappai Journal, pp. 99–103, "A New Family of Linear Ethylene Polymers Provides Enhanced Sealing performance" by Van der Sanden et al.

1979 Plastics Process Engineering, pp. 429, 442–443, "Cooling of Plastic Outside The Extruder", by James L. Throne.

1982 Plastics Materials and Processes, pp. 592–594, by Seymour S. Schwartz et al.

Schwartz et al., Plastics Materials and Processing, Van Nostrand Reinhold Co., N.Y., 592–4 (1982).

Throne, Plastics Process Engineering, Marcel Dekker, Inc., N.Y., 442 (1979).

BIORIENTED BLOWN FILM

CROSS-REFERENCE TO RELATED APPLICATION

This is a divisional of application Ser. No. 08/108,875 filed Aug. 18, 1993, now abandoned which is a divisional of application Ser. No. 07/535,097 filed Jun. 8, 1990 now U.S. Pat. No. 5,241,030.

FIELD OF THE INVENTION

The present invention relates to a bioriented film, to a process for producing the bioriented film and to the use of the bioriented film for wrapping articles, such as consumer goods or food products.

BACKGROUND OF THE INVENTION

Films used for wrapping articles such as consumer goods, for example books, records, compact discs, video cassettes, games, boxes etc., or food products such as fruits, pizzas, chocolate boxes etc., must be provided with a number of properties in order to meet the package requirements in terms of integrity and attractiveness. These properties mainly are excellent optical properties, i.e. high gloss, high clarity and low haze a balanced shrinkage in cross-direction and machine direction at low temperature and a low shrink tension.

Polyvinylchloride (PVC) films meet these requirements and are used to a great extent for wrapping consumer products. However, the environmental concerns about the extended use of PVC films are increasing and the toxic fumes emitted during the sealing of the PVC films can corrode the sealing bars. Therefore, the skilled artisans have tried to replace PVC films with other films having similar properties but causing less environmental concerns. Much research efforts have been spent on ethylene polymer films. Biaxially oriented tubular polyethylene films were found to usually have the required properties for wrapping articles.

U.S. Pat. Nos. 4,354,997 and 4,463,153 disclose a process for producing biaxially oriented blown polyethylene films by biaxially stretching non-stretched tubular films produced from an ethylene polymer, such as low density polyethylene, linear low density polyethylene or a copolymer of ethylene as a main component and an alpha-olefinically unsaturated monomer. The non-stretched tubular film is expanded and extended under particular conditions at a special temperature profile simultaneously in the cross-direction and in the machine direction by means of an internal air pressure.

European Patent Application 0 240 705 relates to tubular heat shrinkable, biaxially stretched, blown films of a mixture of (A) 90 to 50 percent by weight of a linear ethylene/alpha-olefin copolymer having a density of 0.90 to 0.93 g/cm$^3$ at 25° C. and (B) 10 to 50 percent by weight of an ethylene polymer having a density of 0.87 to 0.91 g/cm$^3$ at 25° C. and less than the density of the copolymer (A) by at least 0.014 g/cm$^3$. The non-stretched tubular film is expanded and stretched and, at the same time, biaxially oriented simultaneously in the cross-direction and machine direction by means of an air pressure in the tube.

British Patent specification 866,820 relates to films made of high or low pressure polyethylene, polypropylene or ethylene/propylene copolymers. The polymeric material which has been oriented by uni-axial or bi-axial stretching during its production is first subjected to high energy ionising irradiation. Then the material is heated and uni- or bi-axially oriented and finally cooled. A tubular film is used as a starting material for the first biaxial orientation. Due to the irridation, the high temperature tensile strength of the film is increased. The biaxial orientation after irridation is carried out by inflating the film with air or other gas or with a liquid to form a bubble. According to this bubble technique a blown film is produced which is simultaneously oriented in the cross-direction and in the machine direction.

U.S. Pat. No. 4,680,207 relates to a biaxially oriented linear low density polyethylene film which has been stretched in the cross-direction at a stretching ratio of greater than 1 to less than 3 and in the machine direction at a stretching ratio of less than 6 but greater than the stretching ratio in the cross-direction. The film is produced as follows: a molten linear low density polyethylene which is optionally mixed with a low density non-linear polyethylene resin is extruded, blown to a film and biaxially oriented in special equipment. The film is useful for producing tubular and heavy duty shipping sacks.

For producing shrinkable films having high optical clarity, good shrink properties and good mechanical properties British Patent specification 2,097,324 suggests a film made by stretching a film made of the following homogeneous polymeric composition:

(1) 5 to 100 weight percent of a linear copolymer of ethylene with at least one $C_8$–$C_{18}$-alpha-olefin, said polymer having a density of 0.900 to 0.940 g/cm$^3$ and two distinct crystallite melting regions below 128° C. as determined by differential scanning calorimetry (DSC), the temperature difference between those regions being at least 15° C. and (2) 0 to 95 weight percent of at least one polymer selected from the group consisting of ethylene homopolymers and copolymers of ethylene with an ethylenically unsaturated comonomer, said polymer having only one crystallite melting point below 128° C.

The stretching of the film must be carried out within the temperature range defined by the two crystallite melting points of the copolymer (1). The polymers (2) are conventional ethylene homopolymers or copolymers. According to British Patent Specification 2,097,324 "conventional ethylene homopolymers or copolymers" are high density or low density polyethylene made at high pressure or low pressure. According to British Patent Specification 2,097,324 such conventional ethylene polymers having only one crystallite melting point below 128° C. are not useful for producing the shrink films and linear copolymers of ethylene and 1-octene or another alpha-olefin wherein the alpha-olefin comonomer is present in such small amounts that a second DSC peak is not observed are not suitable for producing the shrink films either. The films are produced on a tubular film production line which combines the extrusion and the orientation of the film. British Patent 2,097,324 teaches by reference to U.S. Pat. No. 3,141,912 that the tubular film is oriented by a combination of expansion and longitudinal stretching. The film is biaxially oriented in a continous manner in two mutually perpendicular directions.

The ethylene polymers and polymer compositions disclosed in U.S. Pat. Nos. 4,354,997, 4,463,153 and 4,680,207, in European Patent Application 0 240 705 and in British Patent specifications 866,820 and 2,097,324 are useful for producing films which are simultaneously bioriented in the machine direction and cross-direction. However, only blown tubular films can be bioriented according to the teaching in the above-mentioned publications. A special processing line is required for the biorientation process. The processing line must be able to maintain a permanent gas pressure inside the tubular film. The teaching of the above-mentioned publications is not useful for biorienting cast films or other flat, i.e. non-tubular films.

Flat films such as cast films are usually bioriented in at least two steps, first in one direction and then in the other direction. The inventors have tried to biorient, on a cast film production line, a flat film produced from the polymers disclosed in British Patent Specification 2,097,324. However, the produced films were found to be quite sensitive to minor changes of the processing conditions, such as the stretching temperature, the stretching ratio or the speed of the film production line.

European Patent Application 0212731 suggests the preparation of a mono-axially oriented cast film on the basis of an ethylene homo- or copolymer having a density below 940 kg/m$^3$. The ethylene polymer may be blended with high density polyethylene or polypropylene and/or different types of ethylene homo- or copolymers having a low density. The use of low density ethylene homopolymers, optionally mixed with minor amounts of other ethylene polymers, for preparing the mono-axially oriented film is exemplified.

It would be desirable to provide a new bioriented film based on ethylene polymers which can be produced from a flat film according to a stretching process involving at least two orientation steps in which the processing conditions, such as temperature and stretching ratio, can be chosen within a relatively broad range and the process parameters may be changed to some extent during the stretching process without a substantial quality loss of the bioriented film. Furthermore, it would be desirable to provide a new process for producing bioriented films from flat films.

SUMMARY OF THE INVENTION

One aspect of the present invention is a mono- or multilayered bioriented cast film wherein the film-forming polymers of at least one layer are (A) from 75 to 100 percent of at least one linear ethylene/ alpha-olefin copolymer having a density of from 0.890 to 0.930 g/cm$^3$ and (B) from 25 to 0 percent of at least one high density linear polyethylene having a density of from 0.935 to 0.960 g/cm$^3$, all percentages being based on the total weight of (A) and (B), with the proviso that the total of the film-forming polymers (A) and (B) has a single melting point as determined by differential scanning calorimetry according to ASTM D-3417.

The term "bioriented film" as used herein relates to films which, after they have been produced, are heated and mechanically oriented by stretching in the machine direction and in the cross-direction. It is understood in the art that the term "film orientation" refers to film drawing or stretching which occurs at a temperature below the cristalline melting point (Tc) and does not refer to the normal film drawing which occurs in the blown film process above Tc.

A further aspect of the present invention is a process for producing a mono- or multilayered bioriented film by orienting a flat mono- or multilayered film, wherein the film-forming polymers of at least one layer are the above-mentioned polymers (A) and (B), in at least two steps first in one direction and then in the other direction. The produced mono- or multilayered. bioriented film preferably is a cast film.

Yet another aspect of the present invention is a process for packaging an article with the bioriented film of the present invention wherein the film is wrapped around the article, sealed and shrunk.

The film of the present invention has good mechanical and excellent optical properties, such as a high gloss, and good shrinkage in the machine and cross-direction as well as a low shrink tension. Furthermore, when producing a bioriented film according to the process of the present invention by biorienting a flat film, the processing conditions during the orientation are not very critical. Specifically, the orientation in the cross-direction of the film can occur within a wide temperature range and a wide range of stretching ratios while maintaining the good mechanical and optical properties of the film.

DETAILED DESCRIPTION OF THE INVENTION

Figure 1:
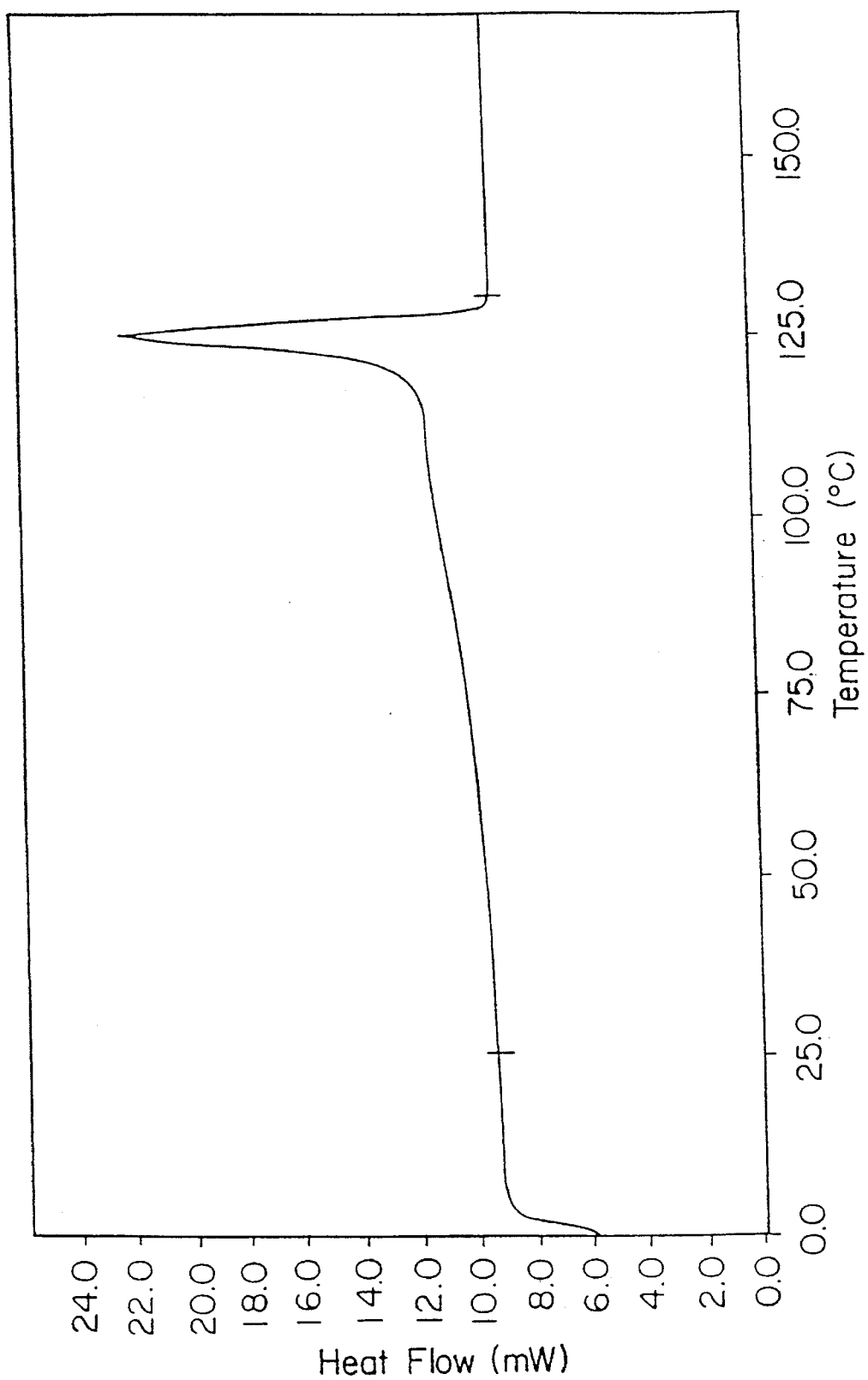
FIG. 1 and 2 represent DSC curves of the polymers (A) used for producing the films of Examples 1 and 2.

The film can be mono- or multilayered. The film-forming polymers of at least one layer must be the polymers (A) and, optionally, (B) in the amounts described below. A monolayered film or a multilayered film in which all layers contain the film-forming polymers (A) or (A) and (B) is preferred. The mentioned layer(s) have as film-forming polymers (A) from 75 to 100 percent, preferably from 85 to 100 percent, more preferably from 95 to 100 percent and most preferably 100 percent of a linear ethylene/alpha-olefin copolymer having a density of from 0.890 to 0.930 g/cm$^3$ and (B) from 25 to 0 percent, preferably from 15 to 0 percent, more preferably from 5 to 0 percent and most preferably 0 percent of a high density linear polyethylene having a density of from 0.935 to 0.960 g/cm$^3$.

The total of the film-forming polymers (A) and (B) must have a single melting point as determined by differential scanning calorimetry according to ASTM method D-3417.

It is possible to use linear ethylene/alphaole-fin copolymers having a density of from 0.890 to 0.930 g/cm$^3$ which have two distinct crystallite melting regions, however, it has been found that in this case the ethylene/alpha-olefin copolymer (A) has to be blended with another polymer in order to allow biorientation of the film in a wide temperature range and a wide range of stretching ratios while maintaining good film properties. Surprisingly, it has been found that by blending a linear ethylene/alpha-olefin copolymer (A) having two distinct crystallite melting regions with a high density linear polyethylene (B) in a suitable weight ratio, polymer blends are obtained which have a single melting point as determined by differential scanning calorimetry and that such polymer compositions can easily be processed to bioriented films. The preferred weight ratios between a particular linear ethylene/alpha-olefin copolymer (A) and a particular high density polyethylene (B) can be determined by differential scanning calorimetry (DSC) according to ASTM method D-3417 by evaluating the DSC curves at different weight ratios between (A) and (B) and chosing those weight ratios which have a single melting point.

It is also possible to blend a linear ethylene/alpha-copolymer (A) having a density of from 0.890 to 0.930 g/cm$^3$ and having a single melting point as determined by DSC with a high density linear polyethylene (B) provided that the blend of (A) and (B) has a single melting point.

Preferably, the linear ethylene/alpha-olefin copolymer (A) is not blended with any amount of high density linear polyethylene (B). In this case the linear ethylene/alpha-olefin copolymer (A) must have a single melting point as determined by DSC and in this case the low density linear copolymers of ethylene with at least one $C_{8-18}$-alpha-olefin disclosed in British Patent Specification 2,097,324 are not useful for the purpose of the present invention.

Non-oriented films, i.e. films which have not been stretched at a temperature below the crystalline melting point, produced of linear low density polyethylene (LLDPE) are known from various publications. The International Patent application WO 84/02707 discloses compression rolled films of LLDPE having a density of less than 0.94 g/cm$^3$. The LLDPE can be blended with a high density polyethylene, a polypropylene or with an ethylene/propylene copolymer. The compression-rolling is carried out at 15 to 80° C. No substantial orientation is achieved by this process.

British Patent Application 2,066,271 relates to a polymer composition comprising (1) an ethylene/$C_3$–$C_8$-alpha olefin copolymer having an intrinsic viscosity of 1.3 to 8.7 dl/g and a density of 0.850 to 0.930 and (2) an ethylene polymer having a melt index of 0.01 to 0.2, a flow parameter of 1.9 to 2.8 and a density not lower than 0.940. The weight ratio between component (1) and component (2) is 0.1 to 40:99.9 to 60. The British Patent application teaches that the film forming property will be deteriorated if the polymer composition comprises more than 40 weight percent of component (1). A film is blown from the polymer composition which is not subjected to a subsequent orientation process.

European Patent application 0100689 relates to polyethylene compositions comprising (A) from 60 to 90 weight percent of an ethylene/$C_{3-12}$-alpha-olefin having a density of from 0.905 to 0.925 g/cm$^3$ and a melt index of from 0.5 to 2.5 dg/min and (B) from 10 to 40 weight percent of an ethylene polymer having a density of from 0.95 to 0.97 g/cm$^3$ and a melt index of from 0.05 to 1 dg/min.

The component (A) of the polymer composition preferably has an average content of a $C_{4-12}$-alpha-olefin of 1 to 8 mol percent and the alpha-olefin is heterogeneously distributed in the copolymer, the copolymer comprising crystalline and amorphous fractions. The European Patent application mentions that the polymers have improved extrusion stability and that the polymer composition can be extruded through a cylindrical or flat die. Blown films are extruded between 200° and 280° C. According to all examples blown films are produced. The films are not subjected to a subsequent orientation process. The films are useful for producing heavy duty sacs, as stiff films for automatic packaging and as agricultural films.

However, it has been found that only those linear ethylene/alpha olefin copolymers (A) are useful for preparing bioriented films of good physical properties according to the process of the present invention if their density is not more than 0.930 g/cm$^3$, preferably not more than 0.927/cm$^3$ and more preferably not more than 0.920 g/cm$^3$. Furthermore, only those linear ethylene/alpha olefin copolymers (A) are useful which have a single melting point or, if different types of copolymers (A) are mixed or if the linear ethylene/alpha-olefin copolymers (A) is (are) blended with a minor amount of one or more high density linear polyethylenes (B), only those polymer compositions of (A) and, optionally, (B) are useful which have a single melting point.

It has been found that the way of producing a linear ethylene/alpha-olefin copolymer (A) having a density of from 0.890 to 0.930 g/cm$^3$ influences its melting behaviour. Catalyst composition, feed ratios of the monomers, the temperature and other processing conditions can significantly influence the distribution of the alpha-olefin in the copolymer chains. In those linear ethylene/alpha olefin copolymers (A) which have a single melting point as determined by DSC, the alpha-olefin is inhomogeneously distributed, that is some of the polyethylene chains contain many units which originate from the alpha-olefin and some of the polyethylene chains contain substantially no units which originate from the alpha-olefin. Useful alpha-olefins generally have 3 to 12 carbon atoms, preferably 3 to 8 carbon atoms. Preferred examples are stated below. The lower the amount of the alpha-olefin is, the higher is the density of the linear ethylene/alpha-olefin copolymer. The minimum average amount of the alpha-olefin comonomer has to be chosen in such a manner that the density of the linear ethylene/alpha-olefin copolymer is not more than 0.930 g/cm$^3$. When the alpha-olefin comonomer is 1-octene, the linear ethylene/alpha-olefin copolymer must have an average 1-octene content of at least 3 percent, based on the total amount of ethylene and 1-octene. After copolymerisation of ethylene and the alpha-olefin the sufficient inhomogeneity of the alpha-olefin, that is the desired single melting point behaviour of the linear ethylene/alpha-olefin copolymer, can be examined by differential scanning calorimetry.

The linear ethylene/alpha-olefin copolymers having a density of from 0.890 to 0.930 g/cm$^3$ are typically named in the literature "linear low density polyethylene" (LLDPE). By "linear low density polyethylene" (LLDPE) is meant normally solid ethylene polymers suitable for extrusion, casting, moulding or similar fabrication produced by polymerisation of ethylene with up to 25 percent by weight of the polymer of at least one alpha-olefin having from 3 to 12, preferably 4 to 8, carbon atoms per olefin molecule.

The useful LLDPE copolymers are for example those which are prepared using coordination catalysts, for example the well known Ziegler, Natta or Phillips catalysts or preferably the catalyst compositions described in British Patent Specification 1,500,873. The LLDPE copolymers include those made at low, intermediate or high pressures in solution and gas phase processes. These ethylene polymers contain up to 25 percent, generally from 3 to 20 percent, preferably from 4 to 17 percent, more preferably from 5 to 15 percent, by weight of at least one alpha-olefin comonomer which is preferably selected from the group consisting of propylene, 1-butene, 1-isobutene, 4-methyl-1-pentene, 1-pentene, 1-isopentene, 1-hexene, 1-isohexene, 1-heptene, 1-isoheptene, 1-octene, 1-isooctene, 1-nonene, 1-isononene, 1-decene and 1-isodecene. 1-Hexene, 4-methyl-1-pentene, 1-butene, propylene and in particular 1-octene are the most preferred comonomers. The amount of comonomers should be enough to result in polymer densities of 0.890 to 0.930 g/cm$^3$, preferably from 0.900 to 0.927 g/cm$^3$ and more preferably from 0.910 to 0.920 g/cm$^3$. The copolymers generally have a high molecular weight and have a melt index (melt flow) in the range of 0.1 to 30 dg/min., preferably of from 1 to 20 dg/min., more preferably of from 2 to 6 dg/min., as measured by ASTM-D-1238, condition (E).

The linear polyethylene (B) which has a density of from 0.935 to 0.960 g/cm³, preferably from 0.940 to 0.960 g/cm³, is well known in the Art as high density polyethylene (HDPE). Generally, the linear polyethylene (B) has a melt index of from 0.5 to 25 dg/min., preferably of from 1 to 10 dg/min. HDPE includes the linear polymers made at low pressure using a coordination catalyst such as a "Ziegler-type" catalyst. Methods of preparing such polymers are well known in the art, for example as taught by Schildknecht, Polymer Processes Vol. X (1956) or in Chem. Eng. News, 5 December 1977. The HDPE is preferably produced according to a solution polymerization process.

The bioriented film of the present invention preferably consists of a single layer or of several layers which all contain the film-forming polymers (A) and, optionally, (B) as described above. However, a multilayered bioriented film may also contain one or more layers of a known polymer or polymer composition, such as polypropylene, polybutene, a blend of polypropylene and polybutene or a blend of polypropylene and/or polybutene with polyethylene provided that such additional layers do not cause substantial difficulties in the process for producing the films and do not deteriorate the properties of the bioriented film.

The bioriented film of the present invention can contain known additives, such as slip agents, for example erucamide or oleoamide, antiblock agents such as silica or well-known antistatic agents. Such additives are generally present in amounts of no more than 5 percent by the weight of the film-forming polymers (A) and (B).

The above described polymer (A), optionally blended with a polymer (B) and/or optional additives, can be fabricated to a film or sheet in a known manner. For example, a film can be produced according to the blown-film technique wherein an extruded tube of molten polymer is inflated to the desired "bubble" diameter and/or film thickness. The produced tubular film is opened to make a flat film. Alternatively, a flat cast film or sheet can be produced from the molten polymers in a known manner. Known coextrusion techniques can be applied for producing multilayered films or sheets wherein the film-forming polymers of at least one layer are the polymer(s) (A) and, optionally, (B) described above.

In the practice of producing a sheet or film, the polymers are extruded through a flat die for producing a cast film or sheet or through a circular die for producing a tubular film which is opened prior to biorientation. The extrusion temperature generally is more than 200° C., preferably from 220° to 265° C. The extruded film preferably has a thickness of from 100 to 2000 micrometers, more preferably from 400 to 1000 micrometers prior to biorientation.

For producing cast films the polymers are preferably extruded through the flat die onto a chill roll which preferably is immersed in water in order to chill the produced cast film. The temperature of the cast film on the chill roll generally is from 20 to 90° C., preferably from 50° to 80° C. The temperature of the water bath preferably is 25° C. or less.

The flat mono- or multilayered film, i.e. the blown film which has been opened to make a flat film or the cast flat film, is then bioriented in at least two steps. The orientations in the machine direction and in the cross-direction are carried out separately, that is first in the machine direction and then in the cross-direction or vice versa. Between the orientation in the machine direction and the orientation in the cross-direction the film is cooled. Although the film can be stretched in the cross-direction first and then in the machine direction, it is preferred to stretch the film in the machine direction first.

The stretching in the machine direction can be carried out by passing the film through a set of heated rollers revolving at different speed. The heated rollers may have different temperatures. The stretching in the machine direction is typically carried out at a temperature of from 90° to 120° C., preferably from 95° to 115° C., more preferably from 100° to 110° C. The stretching ratio in the machine direction preferably is from 3:1 to 8:1, more preferably from 5:1 to 7:1. The film is then cooled, typically to a temperature between 80° and 100° C., preferably between 85° and 95° C., for example by passing the film over another set of rollers in order to avoid too much relaxation.

The film is then reheated and stretched in the cross-direction. The stretching in the cross-direction is generally carried out in a tenter frame oven. Tenter frame ovens are known in the Art. Typically, a tenter frame oven contains six heating zones of which two zones are used for preheating the film, in the following two zones the film is stretched in the cross-direction and in the last two zones the film is relaxed and annealed. The tenter frame oven may have additional zones. When orienting in cross-direction a film produced of the low density linear copolymers of ethylene with of at least one $C_{8-18}$ alpha-olefin disclosed in British Patent Specification 2 097 324 having two distinct crystallite melting regions, the preheating temperature in the oven is extremely critical to the consistent production of films with good optical properties. It has been found that a deviation of $-1°$ C. from the optimum preheating temperature causes film breakage whereas a deviation of $+1°$ C. from the optimum preheating temperature causes the film to have a "milky" or hazy appearance. Even slight changes in the heat transfer conditions brought about by changes in the speed of hot air fans in the oven have been found sufficient to cause either film breakage or films with milky appearance when using the low density linear ethylene/alpha-olefin copolymers described in the above-mentioned British patent.

This is not the case for the polymer (composition) (A) and optionally (B) used for producing the films of the present invention. Surprisingly, it has been found that when producing the films of the present invention, the preheating temperature in the cross-orienting step can be chosen in quite a wide range while still allowing a consistent film production resulting in films with excellent clarity and gloss. Generally, the preheating temperature can be chosen in the range of from 125° to 145° C., preferably from 130° to 140° C. and more preferably from 135° to 140° C. These preheating temperatures are particularly preferred for those above described linear ethylene/alpha-olefin copolymers (A) which have a density of from 0.917 to 0.920 g/cm³. After having preheated the film, the film is stretched in the cross-direction, generally at a temperature of from 90° to 120° C., preferably from 95° to 115° C., more preferably from 100° to 110° C. The stretching ratio in the cross-direction preferably is from 6:1 to 9:1, more preferably from 7:1 to 8:1, for obtaining balanced shrink properties of the film. The film is then usually annealed at a temperature of from 80° to 110° C., preferably from 85° to 100° C.

The film is generally oriented once in the machine direction and once in the cross-direction. However, if desired in special cases, the film can be oriented twice or more times in the machine direction and/or twice or more times in the cross-direction. The film may then be cooled, preferably to ambient temperature and then wound onto a roll. The bioriented film preferably has a thickness of from 5 to 100 micrometers, preferably from 10 to 60 micrometers, more preferably from 15 to 40 micrometers.

The bioriented film of the present invention can be used for packaging articles, such as food or other consumer goods, by wrapping the film around the article, sealing the film and then shrinking the film around the article. For example, a known hot wire sealing system can be used for sealing. The film can be shrunk in a shrink tunnel or a shrink oven which is known in the art.

The invention is further illustrated by the following examples which should not be construed to limit the scope of the invention. All parts and percentages are by weight unless otherwise mentioned. All linear ethylene/1-octene copolymers (LLDPE) in the Examples contain erucamide as a common slip agent.

EXAMPLE 1

A monolayered film is produced by i) extruding a linear ethylene/1-octene copolymer (LLDPE) having a density of 0.917 g/cm$^3$, measured according to ASTM method D-792, a nominal 1-octene content of 7 percent, determined by infrared measurement according to ASTM D-2238-B, a single melting point measured by DSC according to ASTM D-3417 and a melt index of 2.3 dg/min., measured according to ASTM-D-1238, condition E, at a temperature of 260° C. through a flat die in a Bruckner film production line, and ii) chilling the film on a chill roll to a temperature of 60° C. the chill roll being immersed in a water bath of 26° C.

The produced cast film is then bioriented by a) heating the film to varying temperatures of 100° C. to 116° C. on oil-heated rollers, b) stretching the film in the machine-direction at a stretching ratio of 5.8:1 by passing the film over heated rollers revolving a different speed, the temperature of the rollers prior to stretching being 111° C. and the temperature of the rollers after stretching being 105° C., c) cooling the stretched film to a temperature of 90° C. by passing the film over another set of rollers, d) preheating the film in a tenter frame oven having two preheating zones in which the temperatures are 138° C. and 137° C., stretching the film at a stretching ratio of 8:1 in the cross-direction in the two stretching zones of the tenter frame oven in which the temperatures are 110° C. and 101° C. and relaxing the film in the two relaxation zones of the tenter frame oven at a temperature of 100° C., and e) cooling the film and winding it onto a roll.

The produced bioriented film has a thickness of 17 micrometers.

EXAMPLE 2a

Example 1 is repeated, however, a linear ethylene/1-octene copolymer (LLDPE) having a density of 0.917 g/cm$^3$, a nominal 1-octene content of 7 percent, a single melting point and a melt index of 3.3 dg/min. is used for producing the monolayered bioriented film. The extrusion temperature is 256° C. and the stretching ratio in the cross-direction is 7.8:1.

EXAMPLE 2b

Example 2a is repeated, however the stretching ratio in the machine direction is 4.9:1 and the stretching ratio in the cross-direction is 8.2:1.

EXAMPLE 3

Example 1 is repeated, however, a bioriented film having a thickness of 30 micrometers is produced from a blend of (A) 78 percent of a linear ethylene/1-octene copolymer having a density of 0.912 g/cm$^3$, a nominal 1-octene content of 10 percent, two melting points and a melt index of 3.3 dg/min. (LLDPE) and (B) 22 percent of a HDPE produced by solution polymerization having a density of 0.955 g/cm$^3$ and a melt index of 4.0 dg/min., based on the total weight of (A) and (B). The polymer blend (A)/(B) has a single melting point.

The extrusion temperature is 256° C. and the film is stretched in the machine direction at roller temperatures of 115° C. and 105° C. at a stretching ratio of 5.7:1. The temperatures of the stretching zones in the tenter frame oven are 110° C. and 100° C.

EXAMPLE 4

Example 1 is repeated, however, a bioriented film having a thickness of 30 micrometers is produced. The extrusion temperature is 262° C., the film is stretched in the machine direction at roller temperatures of 115° C. and 105° C., preheated in the tenter frame oven to 140° C./139° C. and stretched in the cross-direction at 112° C./101° C. at a stretching ratio of 7.7:1.

EXAMPLE 5

Example 3 is repeated, however, a bioriented film having a thickness of 30 micrometers is produced from a blend of (A) 85 percent of the linear ethylene/1-octene copolymer used in Example 3 and (B) 15 percent of the HDPE used in Example 3. The extrusion temperature is 255° C. and the roller temperatures when stretching in the machine direction are 111° C. and 105° C.

Comparative Example A

Example 1 is repeated, however a linear ethylene/1-octene copolymer (LLDPE) having a density of 0.917 g/cm$^3$, a nominal 1-octene content of 7 to 8 percent, a melt index of 2.3 dg/min. and two melting points is used for producing the monolayered bioriented film. The LLDPE is commercially available as DOWLEX 2047E. The stretching ratio in the machine direction is 5.0:1 and the roller temperature prior to and after stretching is 104° C. The stretching ratio in the cross-direction is 7.8:1. The temperature in both preheating zones of the tenter frame oven is 139° C. The temperatures in the two stretching zones in the tenter frame oven are 110° C. and 101° C.

Comparative Example B

Comparative Example A is repeated, however the temperature in both preheating zones of the tenter frame oven is 138° C. The film breaks.

Comparative Example C

Comparative Example A is repeated, however the temperature in both preheating zones of the tenter frame oven is 140° C. The produced film has a "milky" or hazy appearance and is not useful for packaging purposes.

Figure 2:
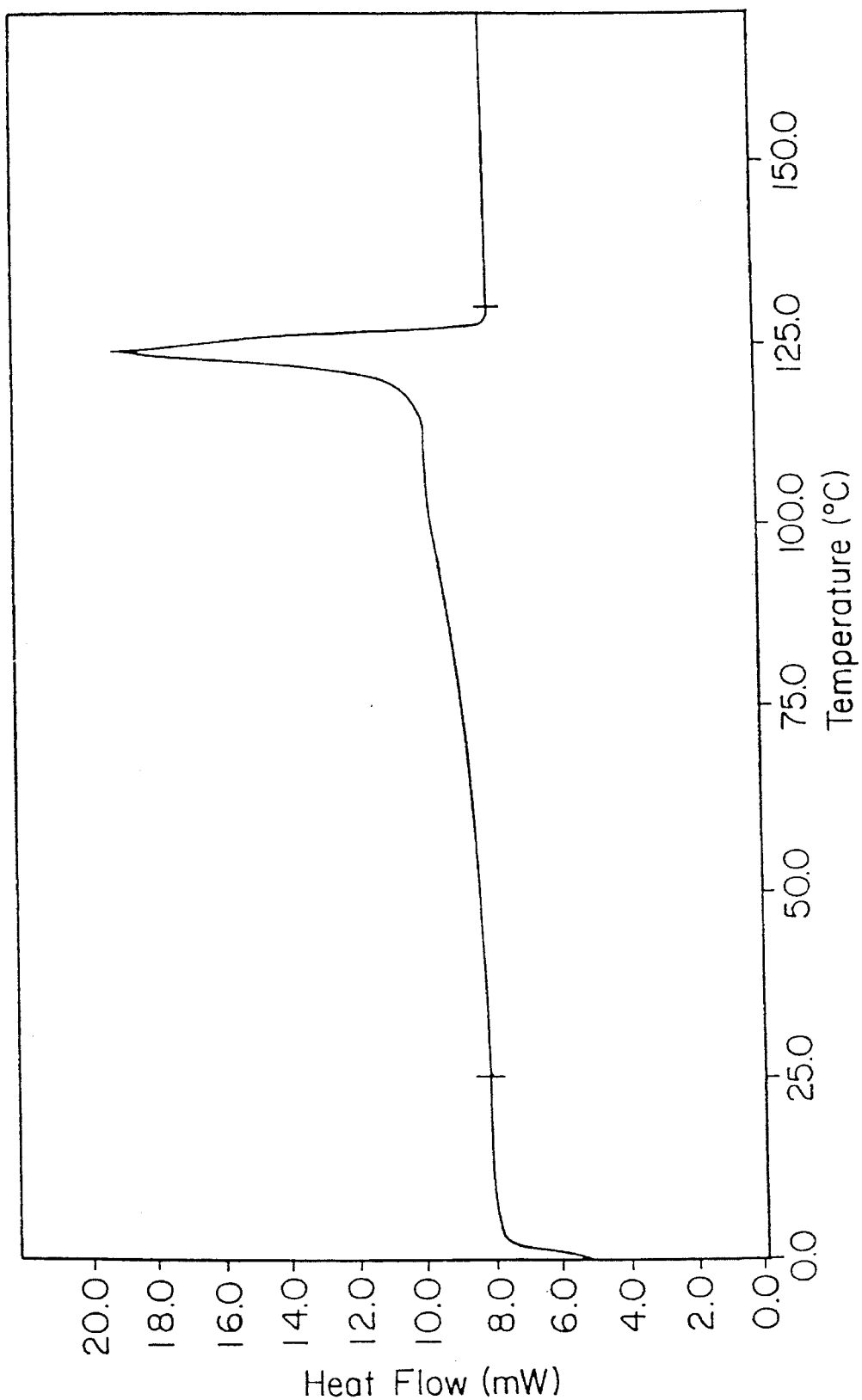
Figure 3:
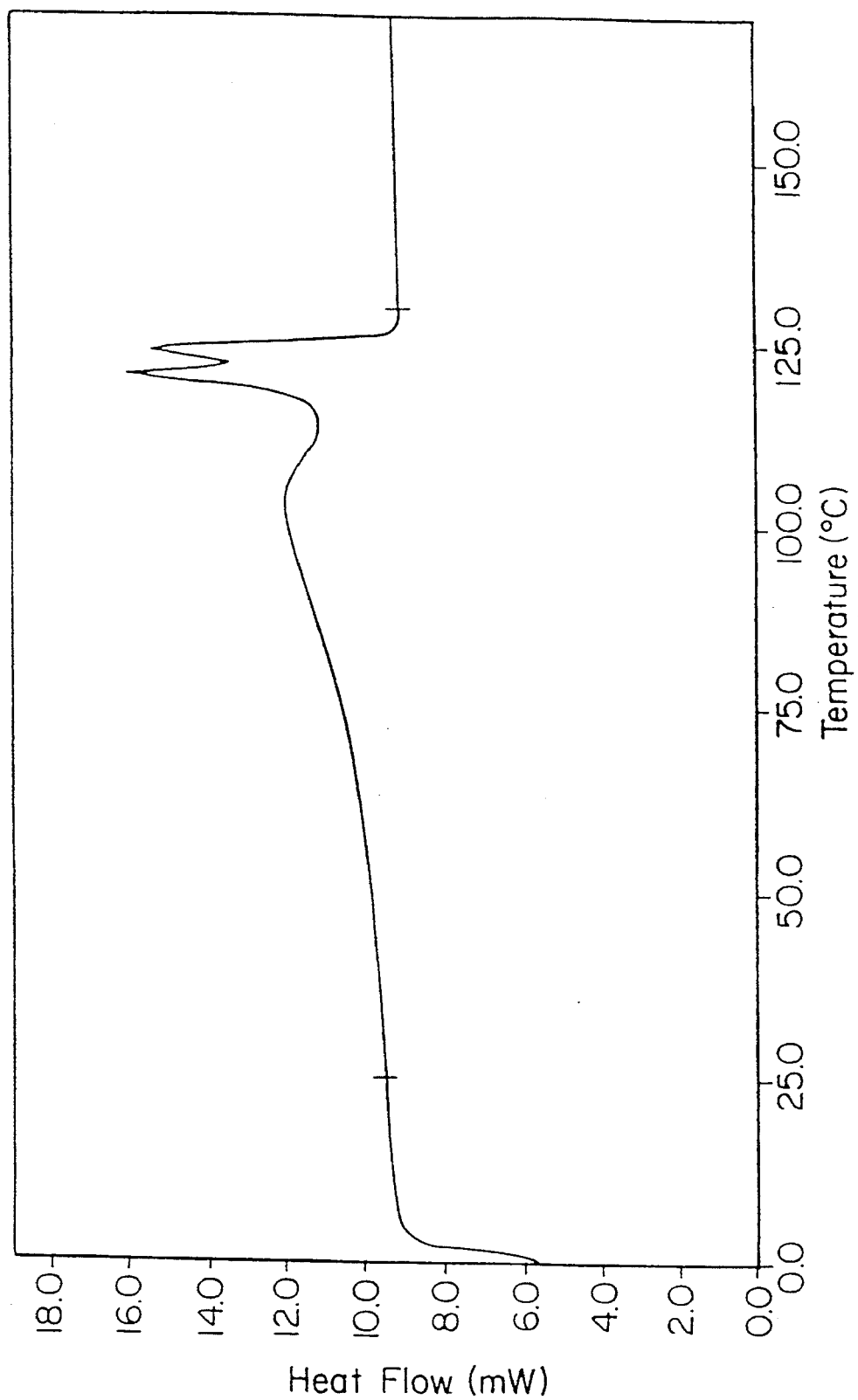
FIG. 3 represents a DSC curve of a polymer (A) from which, after having blended it with a polymer (B), the film of Example 3 is produced.
Figure 4:
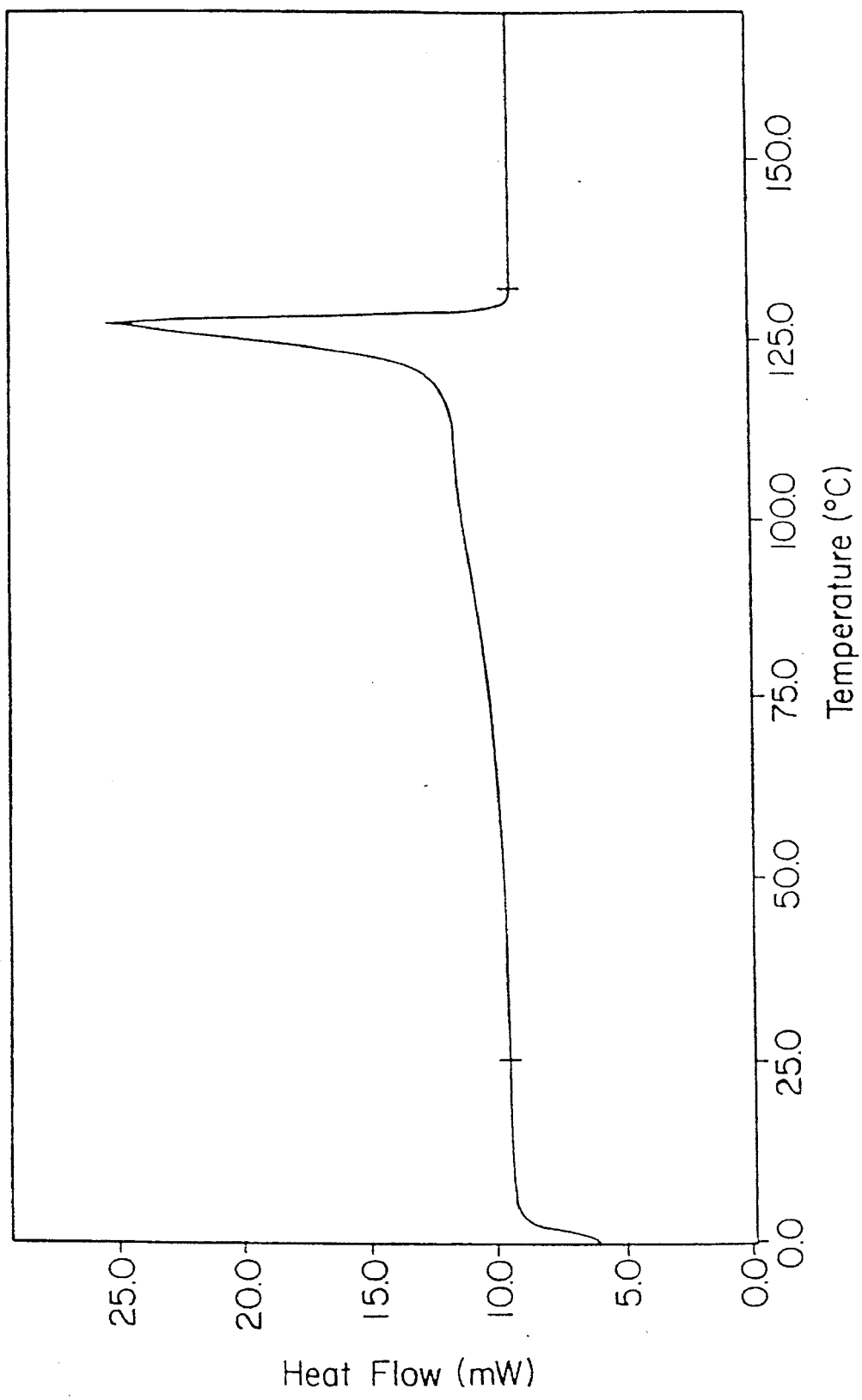
FIG. 4 represents a DSC curve of a blend of polymer (A) and polymer (B) used for producing the film of Example 3.
Figure 5:
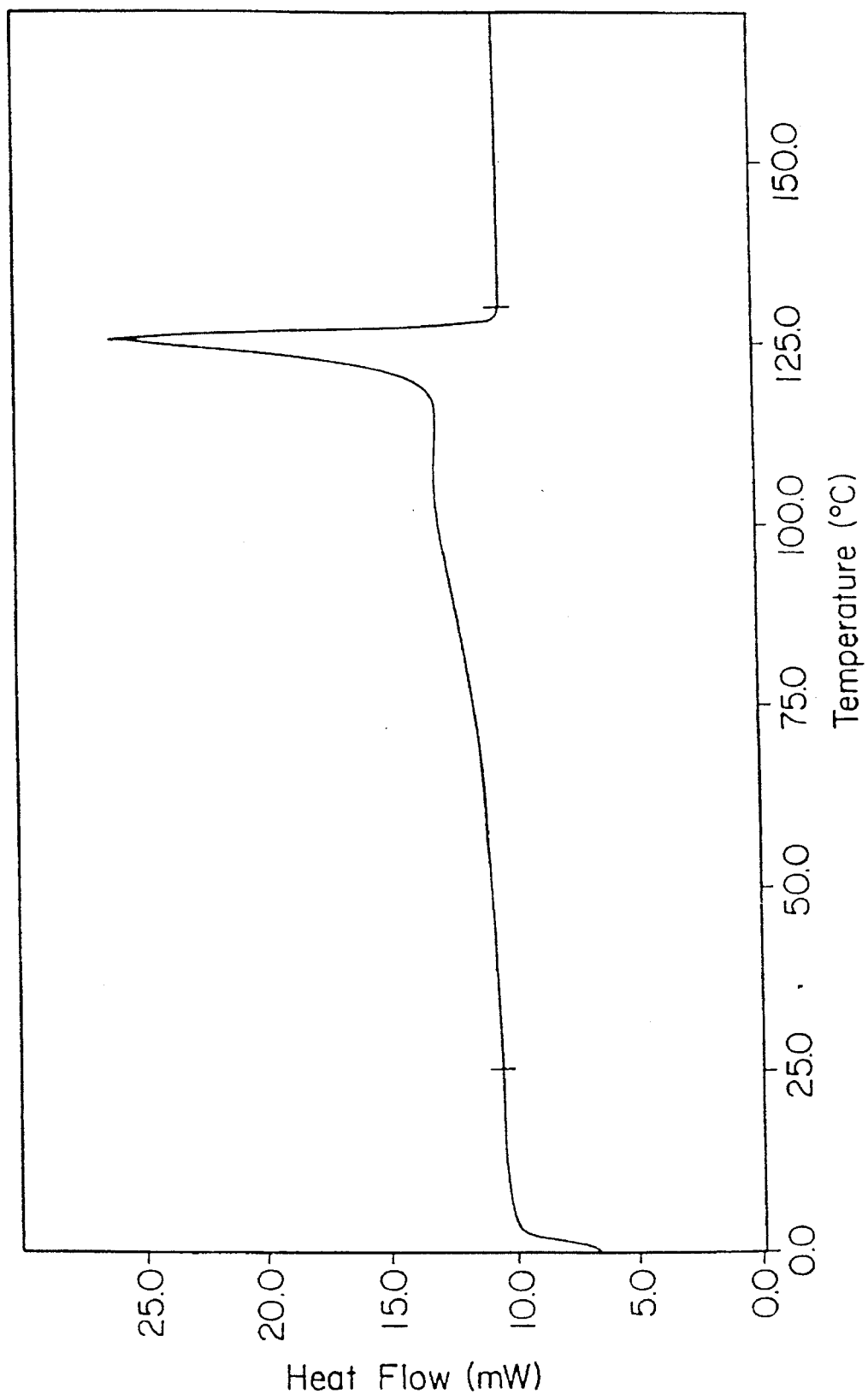
FIG. 5 represents a DSC curve of a blend of polymer (A) and polymer (B) used for producing the film of Example 5.
Figure 6:
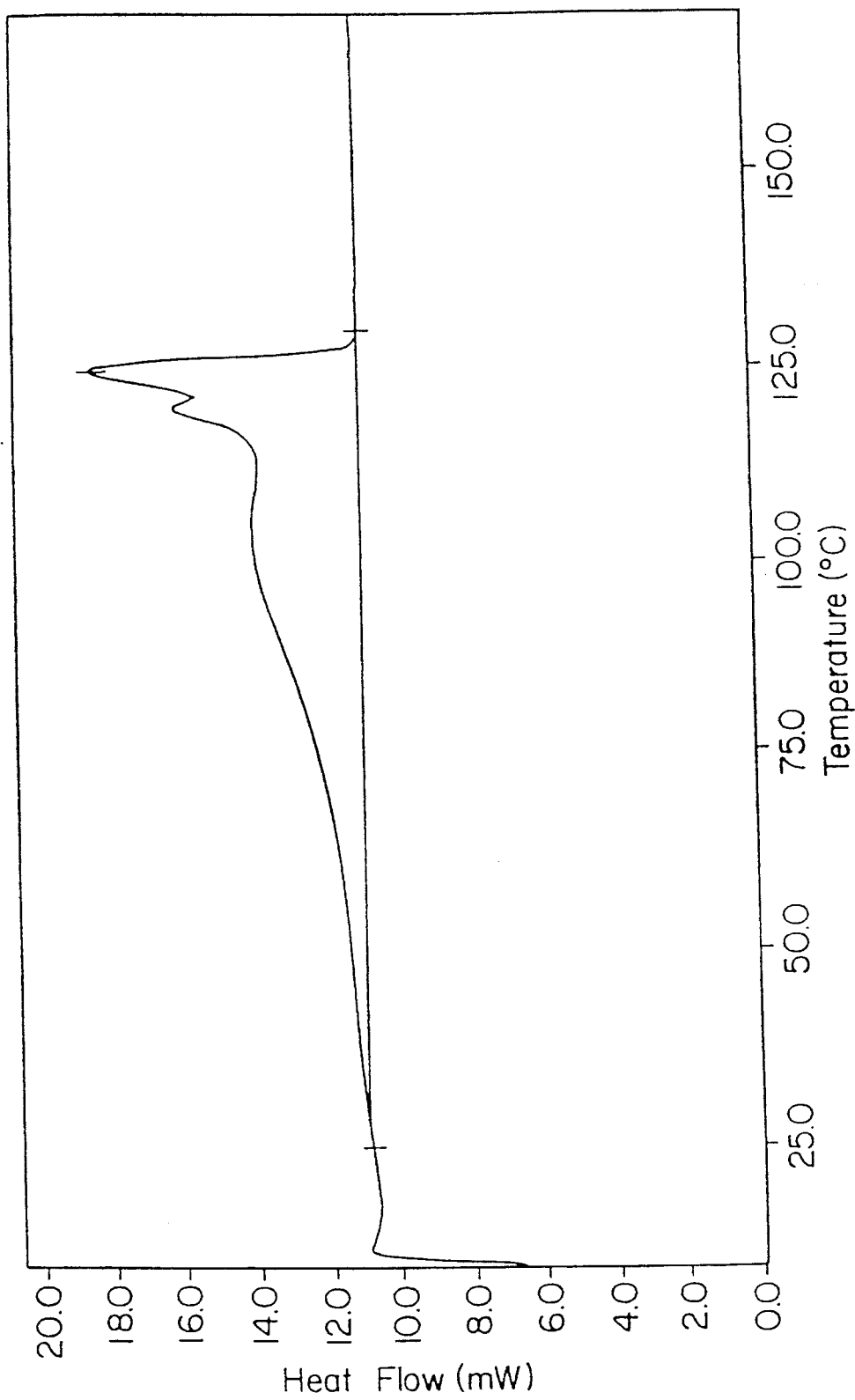
FIG. 6 represents a DSC curve of a linear low density polyethylene used for producing the film of Comparative Example A.

The melting points of the polymers used in Examples 1 to 3 and 5 and in Comparative Example A are determined by differential scanning calorimetry (DSC) according to ASTM-D-3417 using a Perkin-Elmer calorimeter. The DSC curves are shown in FIG. 1 to 6.

TABLE I

| Example | Polymer | Figure | Melting behaviour |
|---|---|---|---|
| 1 | LLDPE | 1 | Single melting point |
| 2 | LLDPE | 2 | Single melting point |
| 3* | 100% LLDPE | 3 | Two melting points |
| 3 | 78% LLDPE and 22% HDPE | 4 | One single melting point |
| 5 | 85% LLDPE and 15% HDPE | 5 | one single melting point |
| A** | LLDPE | 6 | Two melting points |

*LLDPE (A) used in the blend of Example 3; a film made of 100 percent of the LLDPE (A) is not in the scope of the invention.
**Not an Example of the Invention EXAMPLES 6 to 8

Example 2a is repeated, however the stretching ratio in the machine direction and the stretching temperatures in the cross-direction are varied. The processing conditions are summarized in Table II below.

Examples 2a, 2b and 6 to 8 illustrate that the bioriented films of the present invention can be consistently produced and the produced films have good optical properties even when the stretching ratios and stretching temperatures are substantially varied.

The processing conditions for producing the films of Examples 1 to 8 and of Comparative Example A, the physical appearance of the films and the measured physical properties of the films of Examples 1 to 5 and Comparative Example A are listed in Table II below.

The 60° gloss is measured according to ASTM-D-2457.

The haze in percent is measured according to ASTM-D-1003.

The clarity in percent is measured according to ASTM-D-1746.

The Elmendorf tear strength is measured in machine-direction (MD) and in cross-direction (CD) according to ASTM-D-1922.

The puncture resistance/puncture energy is measured as follows:

A film sample which is about 200 mm×200 mm is clamped in a circular clamping system of a diameter of 125 mm. The film must be without wrinkles. An aluminum plunger with a rounded tip of a diameter of 12.5 mm and attached to a load cell is brought against the film such that is just touching. The plunger then advances into the film at a speed of 500 mm/min. until the film punctures. During this time a plotter continuously records the force and the distance moved by the plunger. The maximum force at puncture is recorded in N along with the extension of the film at puncture in mm. The puncture energy in joules is recorded by measuring the total area under the force/extension curve made by the plotter. The average puncture energy for five film samples is listed in Table II.

The free shrinkage in percent is measured as follows:

Five films samples are cut, each measuring 100 mm×5 mm. A sample is then immersed in a silicon oil bath at the desired temperature for 15 seconds. The sample is then removed and placed in a water bath at 23° C. to cool down. The length and width of the sample is measured and the shrinkage is recorded as percentage. This procedure is repeated with the other four samples and the average shrinkage at 4 different temperatures is listed in Table II.

The shrink tension is measured as follows:

Five film samples, each 100 mm×15 mm, are prepared. Each film sample is then fixed in a clamping system such that the clamps are 87 mm apart. The film sample is then immersed in a silicon oil bath held at 130° C. for 10 seconds. The clamps are then moved to their original position and a plotter records the development of the shrink tension. The average shrink tension (in $N/mm^2$) is listed in Table II.

TABLE II

| processing conditions | EXAMPLES | | | | | | | | | |
|---|---|---|---|---|---|---|---|---|---|---|
| | 1 | 2a | 2b | 3 | 4 | 5 | Comp. Ex. A | 6 | 7 | 8 |
| Film thickness (micrometers) | 17 | 17 | 17 | 30 | 30 | 30 | 17 | 17 | 17 | 17 |
| Melt temp. (extrusion temp.) °C. | 260 | 256 | 256 | 256 | 262 | 255 | 260 | 256 | 256 | 256 |
| Machine direction stretching | | | | | | | | | | |
| Ratio | 5.8:1 | 5.8:1 | 4.9:1 | 5.7:1 | 5.8:1 | 5.7:1 | 5.0:1 | 5.5:1 | 5.5:1 | 6.8:1 |
| roller temp. °C. prior to/after shrinkage | 111/105 | 111/105 | 111/105 | 115/105 | 115/105 | 111/105 | 104/104 | 100/90 | 100/90 | 100/90 |
| Cross direction stretching | | | | | | | | | | |
| Ratio | 8:1 | 7.8:1 | 8.2:1 | 8:1 | 7.7:1 | 8:1 | 7.8:1 | 9:1 | 9:1 | 9:1 |
| preheating temp. °C. | 138/137 | 138/137 | 138/137 | 138/137 | 140/139 | 138/137 | 139/139 | 126/133 | 131/135 | 135/132 |
| stretching temp. °C. | 110/101 | 110/101 | 110/101 | 110/100 | 112/101 | 110/10-0 | 110/101 | 106/98 | 106/98 | 105/100 |
| relaxation temp. °C. | 100 | 100 | 100 | 100 | 100 | 100 | 100 | 100 | 100 | 100 |

TABLE II-continued

| processing conditions | EXAMPLES | | | | | | | | | |
|---|---|---|---|---|---|---|---|---|---|---|
| | 1 | 2a | 2b | 3 | 4 | 5 | Comp. Ex. A | 6 | 7 | 8 |
| Visual film appearance | excellent | excellent | excellent | good | excellent | excellent | very good, but sensitive to process cond. (see comp. Ex. B and C) | excellent | excellent | excellent |
| Gloss 60° % | 167 | 165 | 167 | 104 | 159 | 159 | 153 | | | |
| Haze % | 1.2 | 1.1 | 1.0 | 4 | 1.7 | 1.7 | 1.7 | | | |
| Clarity % | 78 | 89 | 89 | 72 | 86 | 85 | 90 | | | |
| Elmendorf MD tear (g) | 13 | 11 | 11 | 20 | 22 | 20 | 10 | | | |
| CD | 8 | 8 | 7 | 8 | 12 | 10 | 9 | | | |
| Puncture energy J | 0.65 | 0.7 | 0.6 | 1.5 | 1.5 | 1.4 | 0.55 | | | |
| Shrinkage % MD/CD | | | | | | | | | | |
| 90° C. | 9/14 | 8/13 | 8/13 | 7/14 | 8/12 | 8/13 | 7/15 | | | |
| 100° C. | 13/23 | 12/24 | 11/23 | 9/22 | 12/23 | 12/24 | 11/28 | | | |
| 110° C. | 26/40 | 24/43 | 16/37 | 28/52 | 20/39 | 43/47 | 21/46 | | | |
| 120° C. | 60/65 | 59/67 | 53/68 | 45/63 | 58/65 | 52/66 | — | | | |
| Shrink tension MD/CD 100° C. N/mm² | 0.8/1.3 | 0.8/1.4 | 0.8/1.3 | 1.4/2.3 | 1.0/1.5 | 1.0/1.6 | 3.8/1.5 | | | |

We claim:

1. A mono- or multilayered bioriented blown film having a degree of orientation as indicated by a stretching ratio of 3:1 to 8:1 in the machine direction and of 6:1 to 9:1 in the cross-direction wherein at least one layer of the film includes as film-forming polymers (A) from 75 to 100 percent of at least one linear ethylene/alpha-olefin copolymer having a density of from 0.890 g/cm³ to 0.930 g/cm³ and (B) from 25 to 0 percent of at least one high density linear polyethylene having a density of from 0.935 g/cm³ to 0.960 g/cm³, all percentages being based on the total weight of (A) and (B), with the proviso that the total of the film-forming polymers (A) and (B) has a single melting point as determined by differential scanning calorimetry according to ASTM D-3417.

2. The bioriented film of claim 1 wherein the film-forming polymers are (A) from about 85 to 100 percent of the linear ethylene/alpha-olefin copolymer and (B) from about 15 to 0 percent of the high density linear polyethylene.

3. The bioriented film of claim 1 wherein the linear ethylene/alpha-olefin copolymer (A) has a density of from about 0.900 g/cm³ to about 0.927 g/cm³.

4. The bioriented film of claim 1 wherein the linear ethylene/alpha-olefin copolymer (A) has a density of from about 0.910 g/cm³ to about 0.920 g/cm³.

5. The bioriented film of claim 1 wherein the alpha-olefin is selected from the group consisting of propylene, 1-butene, 1-isobutene, 4-methyl-1-pentene, 1-pentene, 1-isopentene, 1-hexene, 1-isohexene, 1-heptene, 1-isoheptene, 1-octene, 1-isooctene, 1-nonene, 1-isononene, 1-decene and 1-isodecene.

6. The bioriented film of claim 5 wherein the alpha-olefin is 1-octene.

* * * * *